June 14, 1960  H. GOLDBERG  2,940,199
EAR TAGS FOR MARKING SHEEP AND OTHER ANIMALS
FOR IDENTIFICATION PURPOSES
Filed Sept. 6, 1957

HYMAN GOLDBERG
Inventor

By Wenderoth, Lind & Ponack
Attorneys

UNITED STATES PATENT OFFICE
Certificate of Correction

Patent No. 2,940,199      Hyman Goldberg      June 14, 1960

It is hereby certified that error appears in the above numbered patent requiring correction and that the said Letters Patent should read as corrected below.

In the heading to the present Sheet of drawings, line 4, in the upper right-hand corner insert —2 Sheets-Sheet 1—; and insert Sheet 2, containing Fig. 12, as shown below as part of the Letters Patent:

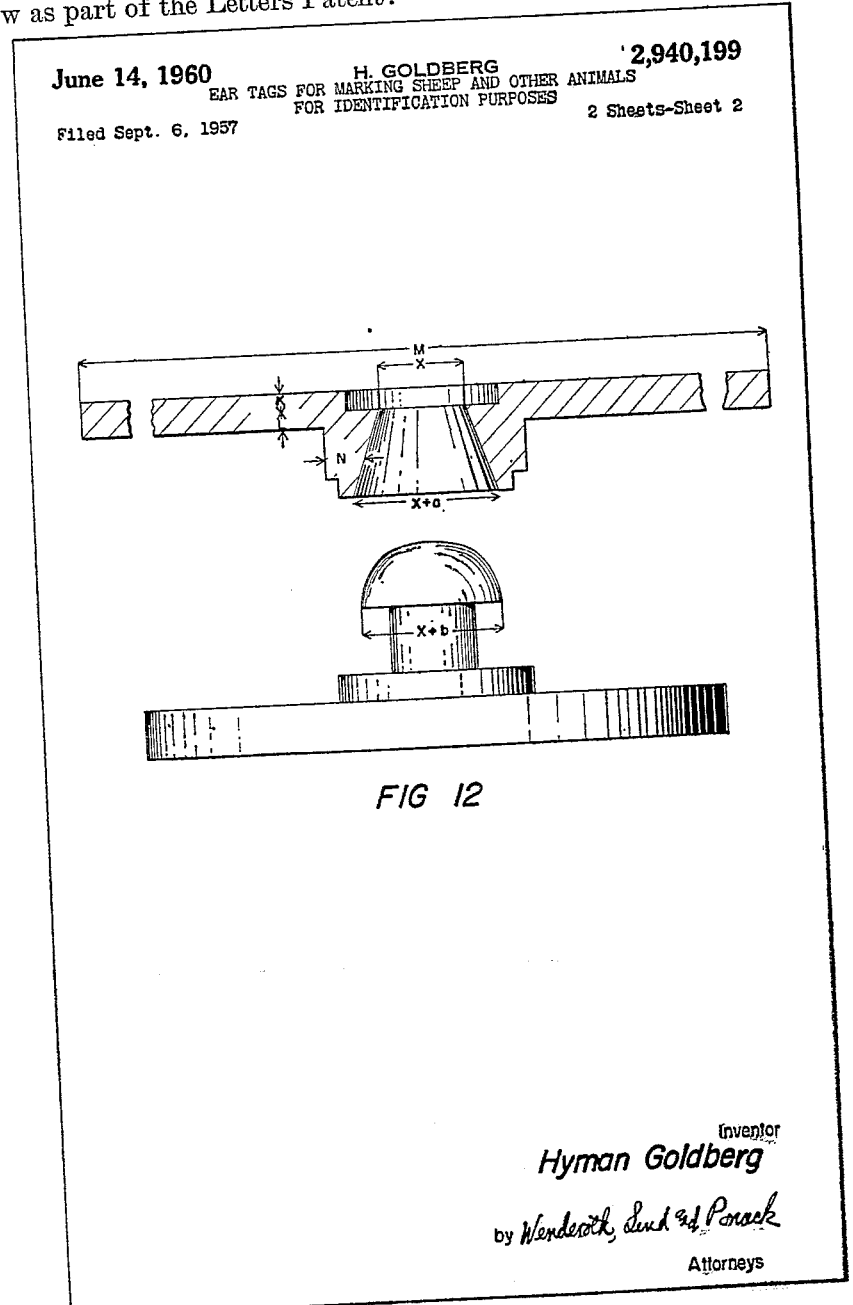

Signed and sealed this 30th day of May 1961.

[SEAL]

Attest:
ERNEST W. SWIDER,
*Attesting Officer.*

DAVID L. LADD,
*Commissioner of Patents.*

United States Patent Office 2,940,199
Patented June 14, 1960

2,940,199

EAR TAGS FOR MARKING SHEEP AND OTHER ANIMALS FOR IDENTIFICATION PURPOSES

Hyman Goldberg, P.O. Box 131, Bellville, Cape Province, Union of South Africa

Filed Sept. 6, 1957, Ser. No. 682,547

Claims priority, application Union of South Africa Sept. 7, 1956

2 Claims. (Cl. 40—301)

This invention relates to improvements in ear tags as used for the marking of sheep and other animals for purposes of identification.

Ear tags for this purpose are known, which require the ear to be punched, whereafter portion of the tag is passed therethrough and fixed against removal by clinching, bending or the like. Usually a tool has to be employed for this purpose.

An object of the present invention is to provide an ear tag which may be secured in position by hand without the use of a special tool.

According to the invention, an ear tag for the purpose set forth, comprises a female part and a coacting male part, the female part being provided with an aperture and the male part being provided with a head adapted to be a press force fit into said aperture in the female part, whereby the device is attachable to an animal's ear by reason of the stem of the male part or a projection on the female part in which said aperture is provided, being passed through a prepared hole in the animal's ear prior to fixing. At least one of the said parts is made of a suitable plastic such as polystyrene or polyethylene.

Preferably the female part is of flat or convex disc form adapted to receive an identification mark or symbol and is provided on one side with a boss or equivalent projection which is provided with the aperture through it, in which the head of the male part is a press or force fit. This boss or like projection is of a size and length to fit snugly the hole punched in the animal's ear, and to form a stop for the female part of the male part when its head has been pressed home. The arrangement is such that, when in position, the device does not squeeze or nip the flesh of the animal's ear so as to cause discomfort or irritation.

In an alternative construction the female part is of disc form with an aperture therein to receive the head of the male part, but without the said boss projection. The stem of the male part is enlarged adjacent to the base end thereof, which enlarged portion is a snug fit in the hole in the animal's ear and acts as a distance piece in the same manner as the aforesaid boss or the equivalent on the female part.

The male head and its coacting aperture in the female part are so shaped and constructed that the male part is capable of being pressed home by a simple pressure between the thumb and forefinger whereafter it is held securely in position. The female part and the base of the male part may be of any shape but are both preferably of circular flat or convex disc form. The base of the male part is preferably smaller in diameter or perimeter than the female part.

The device may be made in any colour or combination of colours so as to be easily visible.

The identification marking may be in large print applied to the outer surface of the part presented to view. In one form the outer surface of the male part is provided with the identification mark, the female part in this case being on the inside of the animal's ear.

However, if desired, the device may be fitted in the reverse manner in which case the outer surface of the female part will be visible and carry the identification marking. Alternatively, both the female and male parts may be marked.

Preferably both parts are made of a suitable plastic or synthetic resin such as polystyrene or polyethylene, although in a modification one part may be of metal.

In ear tags made of a suitable plastic such as polyethylene, use is made of the elastic properties of such material so that when the head of the male part is dimensioned to fit into an undersized hole in the female part, the material expands and/or is compressed sufficiently to permit the head to pass therethrough, but will thereafter prevent said head being withdrawn due to the provision of the shoulder on the underside thereof, unless extreme pressure is employed such as by the use of a special tool of the pliers type.

A feature of the invention is that the head of the male part in its locked position with respect to the female part is adapted to engage behind a shoulder formed by a recess provided in the rear side of the female part.

A further feature of the invention is that the outside diameter of the front end of the projecting boss portion of the female part containing the aperture through which the head of the male part is forced, is made slightly greater than the internal diameter of the aforesaid recess in the rear side of the female part, so that a series of female parts may be pressed frictionally one into the other for temporarily holding said parts together in a stack according to the consecutive numbering or the marks or symbols thereon, so that they may be easily handled in practice.

A further feature of the invention is that at least the head portion of the male part can be made of a different colour from the female part, so that a large number of combinations of colours between the two parts may be used for identification or distinguishing purposes. The head of the male part and/or the coacting aperture in the female part, may be slotted diametrically or radially so as to facilitate entry of the head of the male part into the aperture of the said female part.

According to one construction, the aforesaid boss portion of the female part is provided with a transverse slot and the head of the male portion coacting therewith is made solid. In this case, therefore, when the two parts are forced together, the male part which has a rounded front end, forces the wall portions of the boss part apart to enable it to pass through the aperture and thereafter locates itself within the recess in the rear side of the female part as previously described.

According to another construction, only the head of the male part is provided with one or more transverse slots which enables the head to be squeezed inwardly when it is forced into the aperture in the female part. Thereafter it springs back into position and a shoulder portion beneath the head part engages in the shoulder portion of the recess in the female part, so as to prevent separation of the two parts after they have been fixed to an animal's ear. By making the parts of a suitable plastic, they may be separated when required by the use of an instrument in the form of a pair of pliers so as to force the head of the male part out of the aperture in the female part.

To enable the invention to be more clearly understood and carried into practice, reference is now made to the accompanying drawings in which like references denote like parts throughout the several views,

In the drawings:

Fig. 12 is an enlarged view of the modification of Figs. 2–4 in which both parts are made of plastic, and illustrating preferred dimensions for this modification.

Figure 1:
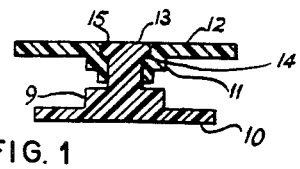
Figure 1 is a sectional view through an ear tag constructed according to the invention.

Referring to Figure 1 of the drawings, a male part 10 is shown engaging in an aperture through the boss portion 11 of a female part 12, both of which parts are made of a suitable flexible and resilient plastic, such as polystyrene or polyethylene. As shown, the stem of the male part 10 is provided with a boss portion 9 and with a flat head 13 which is undercut rearwardly of the front end thereof to provide a shoulder, the plane of which is at right angles to the axis of the stem of the male part. During the coacting engagement of the two parts this shoulder is locked against an annular shoulder 14 formed by a recess 15 in the rear side of the base part 12, which shoulder 14 is also at right angles to the stem of the male part. The resiliency and flexibility of the material used enables the male part 10 to be forced into the aperture of the female part 12 by finger pressure.

Figure 2:
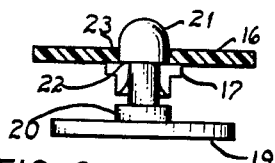
Figure 2 is a part-sectional view through a preferred construction of ear tag.
Figure 3:
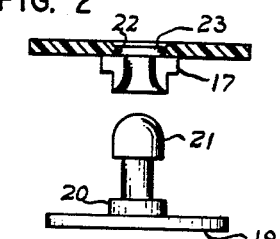
Figure 3 is a view similar to that of Figure 2, but showing the two parts separated from one another.
Figure 4:
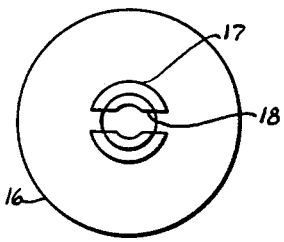
Figure 4 is a plan view of the female part of Figures 2 and 3.

Figures 2, 3 and 4 illustrate a further construction of the invention. In this case, the female part 16 differs from the female part 12 of Figure 1, in that its boss portion 17 is provided with a diametrical slot 18. The male part 19 has the boss portion 20 and a round nosed head 21, which, in its coacting relationship with the aperture in the female part 16, engages behind the annular shoulder 22 formed by the recess 23, in the rear side of the female part 16, as clearly shown in Figure 2.

In this construction both parts are preferably made from a suitable plastic such as polystyrene or polyethylene, although if desired, the male part 19 may be made of a suitable metal such as aluminum or brass.

Figure 6:
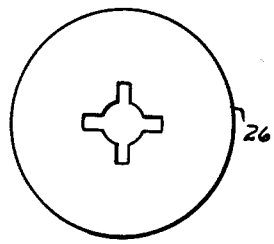
Figure 6 is a plan view of the female part of Figure 5.
Figure 5:
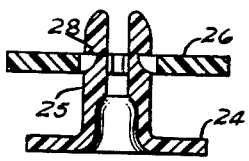
Figure 5 is a sectional view through another modification of the invention.
Figure 7:
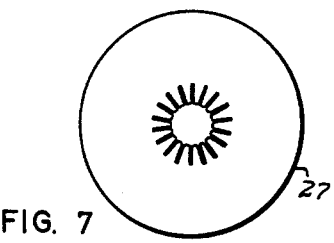
Figure 7 is a plan view of a modified form of female part for use with the male part of Figure 5.

Figures 5, 6 and 7 illustrate a further modified construction of the invention, in which a male part 24 has a stem 25, which is slotted diametrically and coacts with an apertured disc-like female part 26 or 27, the aperture in which is slotted outwardly as shown to provide tongues which engage in an annular circumferential locking groove 28 in the stem 25.

Figure 8:
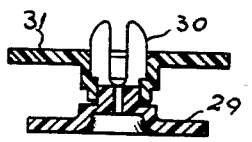
Figure 8 is a sectional view through yet a further modified construction of the invention.

Figure 8 illustrates yet a further modified construction which is similar to that shown in Figure 1 except that the male part 29 is provided with a head 30 which is slotted cruciform fashion to facilitate contraction during its forced insertion in the aperture of the female part 31.

Figure 9:
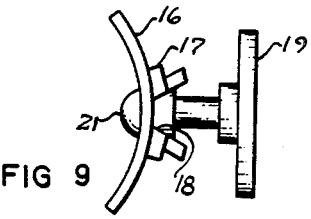
Figure 9 is a side elevation of the ear tag of Figures 2 and 3 and 4, showing how the two parts can be separated by finger manipulation.

Figure 9 illustrates a method of manually separating the two parts of Figures 2, 3 and 4, so that the tag can be removed from an animal's ear for re-use. To do this the female part 16 is grasped between finger and thumb and pressure is applied to cause flexure along the line of the slot 18 as shown. The head 21 of the male part 19 can now be withdrawn by simply pulling it away from the flexed female part 16.

Figure 10:
Figure 10 is a side elevation of a stack of female parts of the kind shown in Figures 1, 2 and 3, illustrating how they are arranged to fit one into the other for convenience in handling.

Figure 10 illustrates the way in which the female parts shown in Figures 1, 2 and 8 may be stacked for easy handling. To achieve this it will be noted that in each case the boss portion of the female part is reduced in diameter at its front end. This diameter is so chosen in conjunction with the bore of the recess in the rear side of the female member, that this reduced free end is a push or frictional fit in said recess.

To facilitate entry of said front end into a recess, the outer edge of the recess is preferably chamfered.

Figure 11:
Figure 11 is a sectional view through a base part of modified shape.

Figure 11 shows a modified form for a female part in which it is of substantially convex shape externally. This is to discourage the tendency of small branches and twigs to catch under the edge of said female part when an animal runs through thick undergrowth or through bushes, which might result in separation of the two parts and their subsequent loss. A further method of achieving the same object is to arrange for the disc portion of the female part to be made relatively thin and flexible so that it would bend over to release a trapped twig before being pulled out of engagement with the male part.

As shown in Fig. 12, the preferred dimensions, in the case of both parts being made of a plastic, are as follows:

If:
$x$ equals diameter on exit side of base part.
$x+a$ equals diameter on entrance side of base part.
$x+b$ equals diameter on expansion of stud part at its widest point.

(1) Then $x+a$ may be equal to or less than or greater than $x+b$.
If $x+a$ is less than $x+b$ then $$\frac{x+b}{x+a}$$

shall not exceed 1.5.

(2) $x$ shall be less than $x+b$ within the range that $$\frac{x+b}{x}$$

is greater than 1.1 and less than 1.8.

Further if:
M equals total diameter of base part.
N equals average thickness of boss under base part where present.
$K+L$ equals thickness of main body of base part where K is the depth of the recess in the face, if present.

(3) Then M shall be greater than $2(K+L)$.
(4) K shall vary from zero to 10L.
(5) N shall be greater than L when L is less than K.

I claim:

1. An ear tag for marking animals which comprises a female part and a coacting male part, the female part having an aperture therethrough with a first shoulder around said aperture, and the male part having a stem thereon with a head with a front end on the end of said stem, said head being substantially larger in diameter than said aperture in the female part and being adapted to be force fitted through the aperture in the female part, at least one of the parts being made of resilient synthetic plastic material, said head being undercut rearwardly of its front end to provide a second shoulder, the plane of which lies substantially at right angles to the axis of the stem of male part, and the material of the edge of said first shoulder being unbroken and substantially at right angles to the axis of the stem of the male part, the device being attachable to an animal's ear by passing the head on said male part through a prepared hole in the animal's ear and, by finger pressure only, passing said head through the aperture in said female part to bring the two parts into their coacting positions in which the undercut second shoulder of the male part fits against and is locked behind the first shoulder around the said aperture in the female part in a positive non-return manner thereby to prevent separation of the two parts except by the use of a special tool.

2. An ear tag as claimed in claim 1 in which the outside diameter of the end of the said boss portion on said base part is slightly greater than the internal diameter of the recess in the opposite side thereof, whereby a series of base parts may be pressed frictionally one into the other for temporarily holding said parts together in a stack.

References Cited in the file of this patent

UNITED STATES PATENTS

| | | |
|---|---|---|
| 492,838 | Rogers | Mar. 7, 1893 |
| 2,794,277 | Dryden | June 4, 1957 |

FOREIGN PATENTS

| | | |
|---|---|---|
| 15,055 | Great Britain | Sept. 24, 1955 |
| 161,270 | Great Britain | Apr. 5, 1921 |
| 173,797 | Great Britain | Jan. 10, 1922 |